United States Patent [19]

Bard

[11] Patent Number: 4,621,001
[45] Date of Patent: Nov. 4, 1986

[54] TILE-SHAPED COMPOSITE ELEMENT

[75] Inventor: Martin Bard, Amberg, Fed. Rep. of Germany

[73] Assignee: Buchtal Gesellschaft mit berschrankter Haftung, Fed. Rep. of Germany

[21] Appl. No.: 703,873

[22] Filed: Feb. 21, 1985

[30] Foreign Application Priority Data

Feb. 29, 1984 [DE] Fed. Rep. of Germany ....... 3407443

[51] Int. Cl.$^4$ .................... B32B 3/30; E04F 13/00
[52] U.S. Cl. .................................. 428/49; 52/384;
52/385; 52/386; 52/391; 428/55; 428/137;
428/172; 428/189; 428/192; 428/288
[58] Field of Search ............... 428/137, 33, 172, 192,
428/189, 251, 252, 253, 428, 49, 55, 288;
156/297, 298; 52/390–392, 384, 388, 389, 386, 385

[56] References Cited

U.S. PATENT DOCUMENTS

| | | | |
|---|---|---|---|
| 2,851,639 | 9/1958 | Ford et al. ........................ | 428/49 |
| 3,088,588 | 5/1963 | Feichter et al. .................. | 428/49 |
| 3,521,418 | 7/1970 | Bartoloni ......................... | 156/297 |
| 4,184,906 | 1/1980 | Young .............................. | 52/384 |
| 4,340,635 | 7/1982 | Langman et al. ................ | 428/172 |

FOREIGN PATENT DOCUMENTS 22666 9/1882 Fed. Rep. of Germany .

Primary Examiner—Paul J. Thibodeau
Attorney, Agent, or Firm—Remy J. VanOphem

[57] ABSTRACT

A tile-shaped composite element is described in which a ceramic tile serving as the visible tile is glued to a further ceramic tile serving as the base tile. In order to add considerable strength to the two single tiles, thereby substantially improving the sturdiness of the composite element, it is proposed that each tile be provided on the back with a nesting structure and glued together with this nesting structure back-to-back. Since the wall thickness of such a composite element may correspond to the usual wall thickness of shingles or conventional ceramic tiles, extremely thin tiles may be used as the base tile and the visible tile palced thereupon. Because there is a nesting structure on the backside, the tiles may be connected and glued together in such a way that the nesting structures, which generally involve continuous straight grooves and ridges, positively engage to lock into each other, thereby considerably strengthening the firm cohesion of the tiles and thus of the composite element.

21 Claims, 10 Drawing Figures

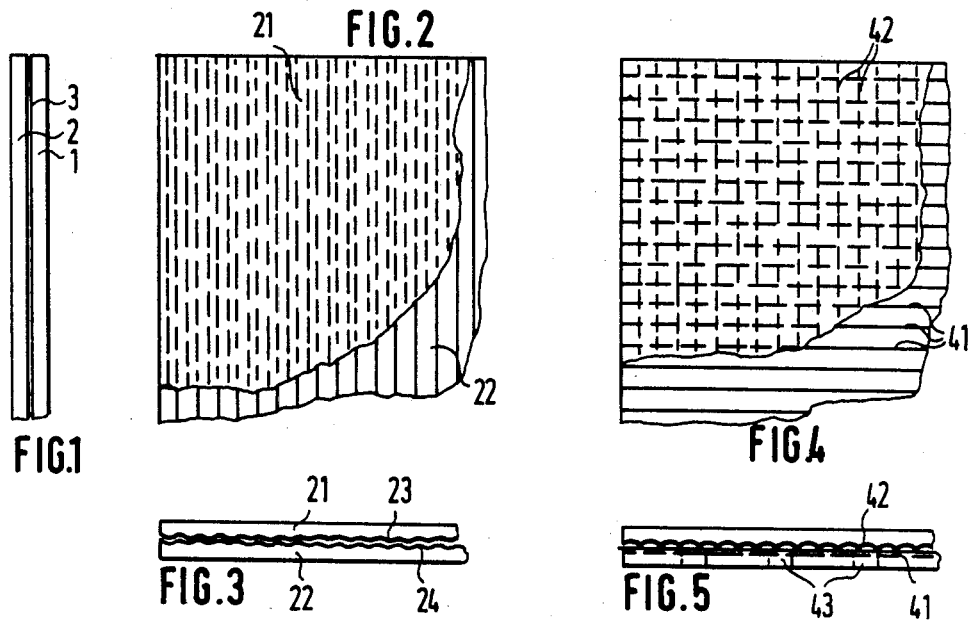
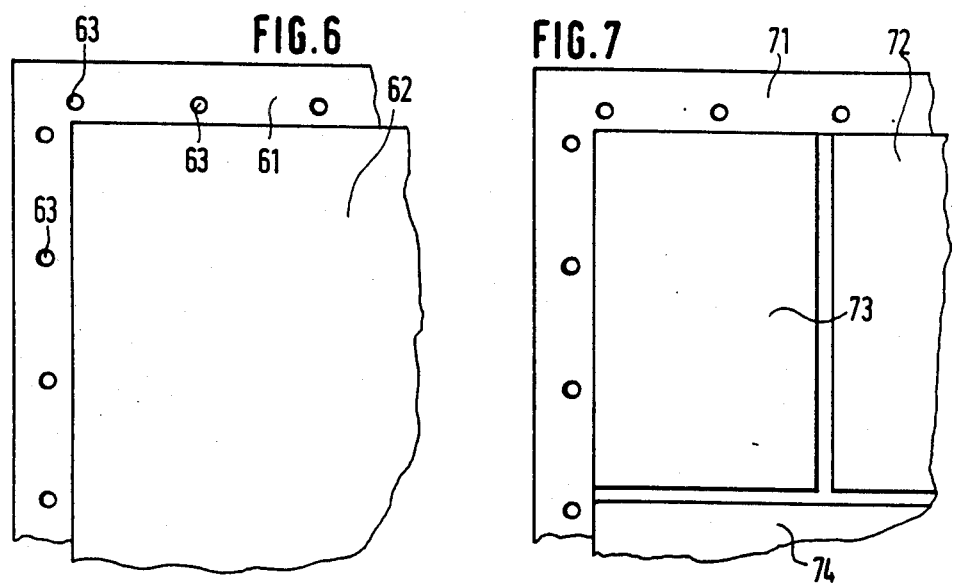

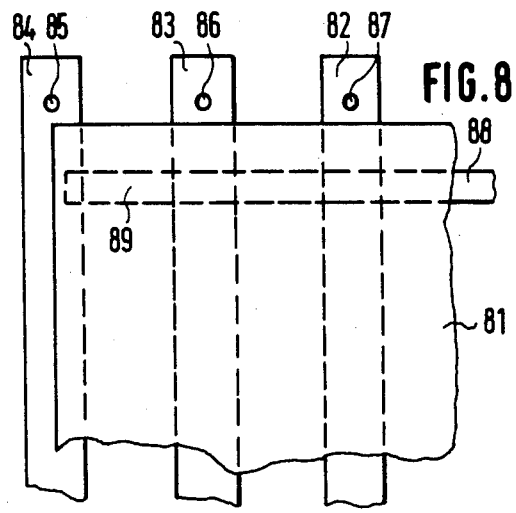
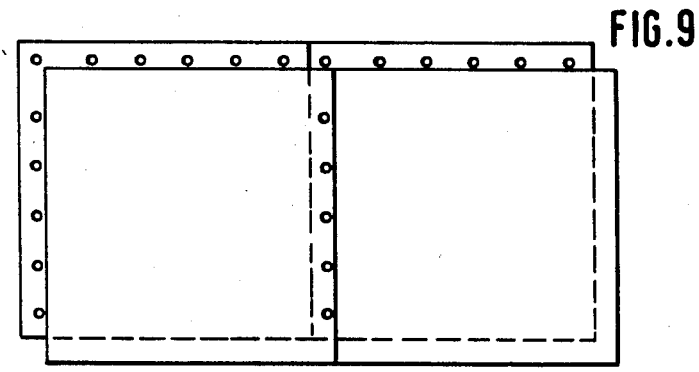
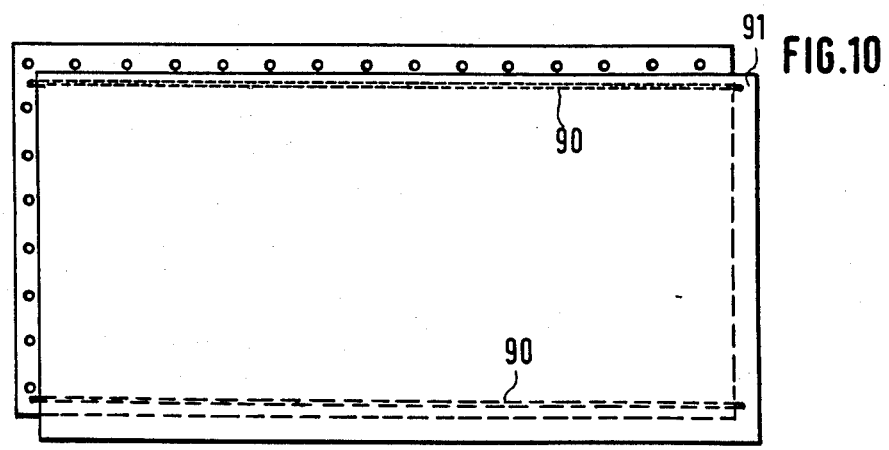

TILE-SHAPED COMPOSITE ELEMENT

BACKGROUND OF THE INVENTION

The present invention relates to a tile-shaped composite element in which a ceramic tile serving as the visible tile is glued onto a further ceramic tile serving as the base tile.

Such a tile-shaped composite element is disclosed in German Patent publication DE-A 22 666 issued in 1883 to Adolph Keim. According to this publication, tiles made of good porous clay, after drying, are coated with a glaze on one side and then laid with the flat glazed surface, one upon the other in pairs, so as to create double tiles whose single tiles are staggered against each other. The double tiles are baked, causing the single tiles to be connected together by the glaze. The tiles formed in this manner are then used to line a wall.

The invention is directed to the problem of lack of cohesion of the tiles described above and teaches of improving a tile-shaped composite element of the stated type in such a way as to substantially strengthen the cohesion between the two single tiles, thereby considerably improving the sturdiness of the composite element.

SUMMARY OF THE PRESENT INVENTION

In order to solve the problem on which the invention is based, it is proposed that the back of each tile be provided with a nesting structure and the tiles glued together with this nesting structure arranged back-to-back.

Since the wall thickness of such a composite element may correspond to the usual wall thickness of shingles or conventional ceramic tiles, extremely thin tiles may be used as the base tiles and the visible tiles laid thereon. Since tiles with a nesting structure on the back thereof are used, the tiles may be interlocked and glued together in such a way that the nesting structures, which generally involve continuous straight grooves and ridges, engage each other, to substantially strengthen the firm cohesion of the tiles and, thus, the composite element.

In another embodiment of the invention, the tiles may be joined together in such a way that the nesting structures on the surfaces to be glued together are at right angles to each other. This allows for a balanced moment of resistance to be achieved in the composite element.

In yet another embodiment, it may also be desirable to lay such a composite element in a mortar bed in the customary manner. It is then expedient for the base tile to be designed with a nesting structure on each side. This leads to an increase in the surface area connecting with the mortar bed. Perforations may also be provided in the base tile, which is very favorable to enhance adhesion with the mortar bed.

The incorporation of perforations in the base tile also results in a reduction in weight of the composite element. The weight reduction is particularly advantageous when the composite element is to be used as an element for producing a facade mounted in front of and spaced away from structures suitable therefor.

Another particularly advantageous embodiment of the invention is when the two tiles of which the composite element is composed are staggered against each other in such a way that the base tile protrudes beyond least one edge of the corresponding edge of the visible tile. The staggering may, of course, also be designed in such a way that the protruding edge appears at two sides of the composite element which are perpendicular to each other. Holes may be provided in these edges for attaching the composite element to base laths, for example, by means of fasteners, such as fastening screws, directed through the holes. The fasteners are no longer visible in the completed surface ultimately lined with the inventive composite elements because the base tile staggered accordingly protrudes beyond the exposed edge and the corresponding edge of the visible tile is placed above this exposed edge.

The overlapping of the visible tile and the base tile may be accomplished in a development of the invention, in such a way as to create a correspondingly narrow or wide decorative joint. This joint may be used as an element of design, and the design of the facade, etc., may be accordingly enhanced by coordinating the color of the base tile with the color of the visible tile or with the arrangement of the visible tiles. In such application it may be desirable for this portion of the base tile, which is visible as part of the joint and also serves to attach the composite element, not to have a heating structure, i.e., for this portion of the base tile to remain smooth unlike the remaining surface thereof.

The base tile itself need not consist of a uniform single tile. One or more tiles of a smaller size may also be used as a base tile or supporting element.

Furthermore, the visible tile may be composed of single elements or formed pieces wherever this appears desirable, so that one obtains a composite element which considerably broadens the scope of architectural design possibilities.

Not only tiles but also all types of prefabricated composite element units may be produced according to the inventive principle. For example, corner pieces, row providing accents, accented edges, etc. One is virtually completely free to arrange the composite elements into designs and utilize them in unlimited arrangements. It is, therefore, possible to reduce the amount of labor expended on laying each composite elements by providing a structural arrangement of the inventive composite element accordingly.

The inventive structural arrangement of the composite element also provides the additional feature that the composite element can be used as a radiant heating element, by using an electrical resistance adhesive or a ceramic electrical resistance binder. The terms "electrical resistance binder" and "electrical resistance adhesive" refer to a material which is electrically conductive but conducts so poorly that the electrical energy conducted into this material is transformed into thermal energy. Binders or adhesives may be contacted accordingly and connected to a power source.

No special insulation is necessary, since when two complete tiles are used as a base tile and visible tile the binder or adhesive located therebetween is located between two insulating ceramic tiles. The electrical contact may be established via a protruding edge or via the entire base tiles when the base tiles and visible tiles are staggered relative to each other, a corresponding reciprocal connection being provided by corresponding contact elements.

The foregoing and other objects, features, and advantages of the present invention will become apparent to those skilled in the art when the following detailed description of the preferred embodiment is read together with the drawings attached hereto.

BRIEF DESCRIPTION OF THE DRAWINGS

FIG. 1 is a side view of a composite element according to the invention;

FIG. 2 is a top view of a composite element with the base tile partially broken away;

FIG. 3 is the side view of a composite element shown in FIG. 2;

FIG. 4 is a top view of another embodiment of a composite element according to the invention with the base tile partially broken away;

FIG. 5 is a side view of the embodiment as shown in FIG. 4;

FIG. 6 is a top view of a composite element according to the invention with a staggered tile arrangement;

FIG. 7 is a top view of a composite element joining the base tile with visible tiles consisting of smaller tiles or formed pieces;

FIG. 8 is another embodiment in which the base tile consists of several smaller pieces;

FIG. 9 is a schematic view of how two composite elements are nested; and

FIG. 10 is a schematic view of a single tile with electrical contact elements provided for a reciprocal connection.

DETAILED DESCRIPTION OF THE PREFERRED EMBODIMENT

In FIG. 1 there is shown the visible tile at 1 and the base tile at 2, which are joined together by an adhesive layer 3.

FIG. 2 shows both a visible tile 21 and a base tile 22 both of which have a nesting structure on the underside which can be seen clearly in FIG. 3. The arrangement is such that the nesting structures on each tile not only run parallel to each other but also interlock, as can be seen at 23. There is an adhesive layer 24 between the two tiles.

FIG. 4 schematically shows a top view of an arrangement in which the nesting structure 41 on one tile is at right angles to the nesting structure 42 on the other tile. FIG. 5 shows a side of FIG. 4 wherein the nesting structure 42 can be seen and the nesting structure 41 at right angles and runs parallel to the plane of projection. A plurality of perforations 43 are also shown in the lower tile.

In FIG. 6 there is shown a base tile 61 on which a visible tile 62 is connected in a staggered arrangement by an adhesive or other ceramic binder (not shown). The protruding edge of the base tile 61 has attachment holes 63 by which the composite element, consisting of the tiles, 61 and 62, may be fastened to a supporting structure using nails and/or screws.

FIG. 7 shows a base tile 71 on which is located a visible tile formed of pieces 72, 73 and 74 or corresponding smaller tiles.

FIG. 8 shows a one-piece visible tile 81 located on a base tile which here consists of various individual elements 82, 83 and 84, each of which exhibits holes 85, 86 and 87. A conducting strip 88 with a lead 89 can also be seen. The conducting strip passes into the adhesive or binder layer which is attached to the back of the visible tile 81. Thus, an electrically heatable composite element is obtained.

FIG. 9 shows how two inventive composite elements can be mounted. It can be clearly seen that there is overlapping which is not visible to a viewer when tiling is completed.

FIG. 10 shows an alternate embodiment for a composite tile used as a radiant heating element. Two conductive strips or wires 90 serving to conduct electricity are located opposite each other on the backside of the visible tile. Alternatively, the strips or wires 90 may be placed on the side of the base tile facing the viewer, these tiles being intimately connected to each other by an electrical resistance adhesive or an electrical resistance binder, such adhesive or binder, when subjected to electric current, exhibits a temperature response such that the current absorption of the material falls towards zero as its temperature increases. Contacting points 91 are adapted to establish a connection to a power source, or to provide for an electrical connection between several such elements.

These and the many other modifications and variations within the spirit of the present invention are included within the intended scope of the claims appended hereto.

What is claimed is:

1. A tile-shaped composite element comprising:
   a ceramic base tile element having a front face portion and a rear face portion positioned opposite said front face portion;
   a ceramic visible tile element having a front face portion and a rear face portion positioned opposite said front face portion; said ceramic visible tile element being juxtaposed said ceramic base tile element with said rear face portion of said ceramic base tile element contiguous said rear face portion of said ceramic visible tile element;
   nesting structure means located on said rear face portion of each of said ceramic base and visible tile element; and
   means for bonding said nesting structure means on said rear face portion of each of said ceramic base and visible tile element whereby said rear face portion of said ceramic base tile element is bonded to said rear face portion of said visible tile element to provide a structurally enhanced composite ceramic tile element.

2. The composite element as claimed in claim 1, wherein said nesting structure means on said rear face portion of each said ceramic base and ceramic visible tile element extend parallel to each other and interlock with each other.

3. The composite element as claimed in claim 1, wherein said nesting structure means on said rear face portion of each said ceramic base and ceramic visible tile element extend at right angles to each other and interlock with each other.

4. The composite element as claimed in claim 1, wherein said ceramic base tile element has a nesting structure means on both said front and rear face portions.

5. The composite element as claimed in claim 1, wherein said ceramic base tile element is provided with perforations.

6. The composite element as claimed in claim 1, wherein said ceramic base tile element and said ceramic visible tile element are mounted together offset from each other to form at least one protruding edge.

7. The composite element as claimed in claim 6, further comprising attachment holes located in said at least one protruding edge of said ceramic base tile element.

8. The composite element as claimed in claim 6, wherein said at least one protruding edge of said ceramic base tile element does not have said nesting structure means on said rear face portion thereof.

9. The composite element as claimed in claim 1, wherein said ceramic visible tile element has a different coloration than that of said ceramic base tile element.

10. The composite element as claimed in claim 1, wherein said ceramic base tile element comprises one or more tiles of a smaller configuration, each of said one or more tiles having an edge partly protruding beyond the edge of said ceramic visible tile element.

11. The composite element as claimed in claim 1, wherein said ceramic visible tile element comprises several tiles of a smaller configuration.

12. The composite element as claimed in claim 11, wherein at least one of the tiles of a smaller configuration is replaced by a prefabricated composite element unit.

13. The composite element as claimed in claim 1, wherein said means for bonding comprises a fibrous media embedded in said bonding means between said ceramic base and visible tile element.

14. The composite element as claimed in claim 1, wherein said means for bonding comprises an elastic adhesive.

15. The composite element as claimed in claim 1, wherein said means for bonding comprises an electrical resistance adhesive.

16. The composite element as claimed in claim 1, wherein said means for bonding comprises a ceramic binder for bonding said ceramic base tile element to said ceramic visible tile element.

17. The composite element as claimed in claim 1, wherein said ceramic binder is an electrical resistance binder.

18. The composite element as claimed in claim 15, wherein the material selected as the material for said electrical resistance adhesive is one which, when subjected to electric current, exhibits a temperature response such that the current absorption of the material falls towards zero as its temperature increases.

19. The composite element as claimed in claim 18, wherein said electrical resistance adhesive is intimately connected with contacting elements for electrically connecting the composite element to an electrical network via a material which, when subjected to electric current, exhibits a temperature response such that the current absorption of the material falls towards zero as its temperature increases.

20. The composite element as claimed in claim 17, wherein the material selected as the material for said electrical resistance binder is one which, when subjected to electric current, exhibits a temperature response such that the current absorption of the material falls towards zero as its temperature increases.

21. The composite element as claimed in claim 20, wherein said electrical resistance binder is intimately connected with contacting elements for electrically connecting the composite element to an electrical network via a material which, when subjected to electric current, exhibits a temperature response such that the current absorption of the material falls towards zero as its temperature increases.

* * * * *

UNITED STATES PATENT AND TRADEMARK OFFICE
CERTIFICATE OF CORRECTION

PATENT NO. : 4,621,001

DATED : November 4, 1986

INVENTOR(S) : Martin Bard

It is certified that error appears in the above-identified patent and that said Letters Patent is hereby corrected as shown below:

Column 1, line 33, delete "correspond" and insert ---- be equivalent ----.

Column 1, line 56, delete the paragraph indention.

Column 1, line 66, before "least" insert ---- at ----.

Column 2, line 21, delete "heating" and insert ---- nesting ----.

Column 2, line 24, delete "uniform single" and insert ---- single uniform ----.

Column 2, line 39, delete "each" and insert ---- such ----.

Column 3, line 7, delete "a" and insert ---- the ----.

Column 3, line 42, after "side" insert ---- view ----.

Column 3, line 43, after "41" insert ---- runs ----.

Column 3, line 44, delete "runs".

UNITED STATES PATENT AND TRADEMARK OFFICE
CERTIFICATE OF CORRECTION

PATENT NO. : 4,621,001
DATED : November 4, 1986
INVENTOR(S) : Martin Bard

It is certified that error appears in the above-identified patent and that said Letters Patent is hereby corrected as shown below:

Column 3, line 49, after "(not shown)" insert ---- such binder may include a fibrous embedded media ----.

In the Abstract

Line 13, delete "palced" and insert ---- placed ----.

Line 19, delete "and thus" and insert ---- and, thus, ----.

Signed and Sealed this

Seventeenth Day of November, 1987

Attest:

DONALD J. QUIGG

*Attesting Officer*     *Commissioner of Patents and Trademarks*